(12) United States Patent
Fukatsu et al.

(10) Patent No.: US 7,980,897 B2
(45) Date of Patent: Jul. 19, 2011

(54) ASYMMETRIC ELECTRONIC PARTS

(75) Inventors: Hiroki Fukatsu, Fuji (JP); Seiji Kayukawa, Fuji (JP); Hirokazu Ohshiba, Fuji (JP); Raita Nishikawa, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 155 days.

(21) Appl. No.: 12/310,130

(22) PCT Filed: Aug. 23, 2007

(86) PCT No.: PCT/JP2007/066824
§ 371 (c)(1),
(2), (4) Date: Feb. 12, 2009

(87) PCT Pub. No.: WO2008/023839
PCT Pub. Date: Feb. 28, 2008

(65) Prior Publication Data
US 2009/0197471 A1    Aug. 6, 2009

(30) Foreign Application Priority Data
Aug. 24, 2006  (JP) .................................. 2006-227448

(51) Int. Cl.
*H01R 13/46* (2006.01)
*C08L 101/12* (2006.01)
*C08K 7/00* (2006.01)
*C09K 19/52* (2006.01)
*C09K 19/38* (2006.01)

(52) U.S. Cl. ................. 439/625; 252/299.01; 252/299.5; 523/220

(58) Field of Classification Search ............. 252/299.01, 252/299.5; 174/50, 52.2; 439/625; 523/220
See application file for complete search history.

(56) References Cited

U.S. PATENT DOCUMENTS

| | | | |
|---|---|---|---|
| 6,680,002 B2 | 1/2004 | Yamauchi et al. | |
| 6,702,955 B1 | 3/2004 | Murakami et al. | |
| 6,797,198 B1 | 9/2004 | Miyashita et al. | |
| 7,789,670 B2 * | 9/2010 | Fukatsu et al. ................ | 439/66 |

(Continued)

FOREIGN PATENT DOCUMENTS

JP        09204951 A     8/1997

(Continued)

*Primary Examiner* — Shean C Wu
(74) *Attorney, Agent, or Firm* — Buchanan Ingersoll & Rooney PC

(57) ABSTRACT

Provided is a material capable of forming a molded product which has good mechanical properties with low warpage while being excellent in any of the performance including heat resistance and flowability, even if the molded product is an asymmetric electronic parts. Specifically, the asymmetric electronic parts is prepared by molding a liquid crystalline polymer composition comprising (A) a fibrous filler having an average fiber diameter within the range of 5 to 30 μm, having a weight average fiber length within the range of 250 to 350 μm, excluding 10 μm or shorter fiber length, and having a content of a fibrous filler being 700 μm or longer within the range of 5% by weight or less; and (B) a plate-like filler having an average particle size within the range of 0.5 to 200 μm, the total filling amount of (A) and (B) components in the composition being within the range of 40 to 60% by weight, the weight ratio of (A) component being within the range of 10 to 20% by weight, the weight ratio of (B) component being within the range of 30 to 40% by weight, the molded product having no symmetry in any of the axial plane XY, the axial plane YZ, and the axial plane XZ of the molded product.

8 Claims, 2 Drawing Sheets

U.S. PATENT DOCUMENTS

2005/0260892 A1  11/2005  Sato

FOREIGN PATENT DOCUMENTS

| | | |
|---|---|---|
| JP | 10219085 A | 8/1998 |
| JP | 2000-178443 A | 6/2000 |
| JP | 2001-106923 A | 4/2001 |
| JP | 2003-128895 A | 5/2003 |
| JP | 2003-171538 A | 6/2003 |
| JP | 2003-246923 A | 9/2003 |
| JP | 2004-213682 A | 7/2004 |
| JP | 2005-339837 A | 12/2005 |
| JP | 2006-164749 A | 6/2006 |

* cited by examiner

ASYMMETRIC ELECTRONIC PARTS

TECHNICAL FIELD

The present invention relates to an asymmetric electronic parts for memory module connector, memory card socket, and the like.

BACKGROUND ARTS

Liquid crystalline polymers are known, among thermoplastic resins, as the materials having excellent dimensional accuracy, vibration damping property, and flowability, which generate very few burrs during molding, and very little gas. By utilizing these characteristics, the liquid crystalline polymers have been adopted in large quantities as the materials for varieties of electronic parts.

In particular, with the increase in performance of electronic equipment in recent years, there have appeared the needs of the times for connectors having high heat resistance (the improvement in productivity supported by packaging technology), high density (multicore), and miniaturization. By taking advantage of the above liquid crystalline polymers, the liquid crystalline polymer compositions reinforced with glass fiber have been adopted as connector materials, (JP-A 9-204951).

However, in recent years, by the further movement toward "lighter and more compact" connectors, there have arisen the problems of the generation of warpage after molding and during reflow-heating owing to the insufficient rigidity resulted from insufficient wall thickness of the molded product and to the internal stress generated by inserting metal terminals, which causes defective soldering with circuit-board. That is, regarding the conventional strengthening only by glass fiber, there has arisen a problem in that a thin wall portion can not be filled with resin, or insert terminals are deformed due to pressure during molding by the increased additive amount of glass fiber for increasing the rigidity.

To solve the warpage problem, molding methods were devised and, from the standpoint of material, filling a specific plate-like filler has been proposed, (JP-A 10-219085 and JP-A 2001-106923).

For ordinary connectors (electronic parts) available in the market in abundance, the dimensional accuracy and warpage of products can be controlled by designing the gate position so as to keep the symmetry during molding, and the products having smaller warpage are further obtained by using a low-warpage material which has already been proposed.

However, with the increased complexity in the shape of electronic parts in recent years, there has been required to provide asymmetric electronic parts that has no symmetry on any of the axial plane XY, axial plane YZ, and axial plane XZ of molded product. Typical samples of that type of asymmetric electronic parts are memory module connectors having a latch structure (having fixing claw at each end), such as DDR-DIMM connector. In particular, since a memory module connector for notebook personal computer has a latch structure for connection and has a notch for positioning, the connector becomes a highly complex shape.

Different from the ordinary connector (symmetric electronic parts) which is symmetry on any of the axial plane XY, axial plane YZ, and axial plane XZ of molded product, the above asymmetric electronic parts have no symmetry, and thus the asymmetric electronic parts have a limitation in improving warpage from the standpoint of molding procedure. Furthermore, an asymmetric electronic parts having a complex shape results in complex orientation of resin and filler within the molded product, which raises a problem of further difficulty in suppressing warpage by required higher flowability, and it impossible to obtain satisfactory product from the conventionally-proposed low-warpage material.

DISCLOSURE OF THE INVENTION

A purpose of the present invention is to solve the above-described technological problems in the prior art, and to provide a material capable of forming a molded product having good mechanical properties, less warpage, and being excellent in any of the performance including heat resistance and flowability, even if the molded product is an asymmetric electronic parts.

The inventors of the present invention have conducted detail search and investigations to provide a material which achieves the above objectives, has excellent performance balance, and is suitable for molding an asymmetric electronic parts, and have found that an asymmetric electronic parts having excellent entire performance including warpage and heat resistance can be obtained by filling glass fibers having a specific length and not having longer than a specific length, and a specific plate-like filler in a liquid crystalline polymer, at a specific filling ratio, respectively, thereby having perfected the present invention.

That is, the present invention provides an asymmetric electronic parts, prepared by molding a liquid crystalline polymer composition comprising (A) a fibrous filler having an average fiber diameter within the range of 5 to 30 μm, having a weight average fiber length within the range of 250 to 350 μm, excluding 10 μm or shorter fiber length, and having a content of a fibrous filler being 700 μm or longer within the range of 5% by weight or less; and (B) a plate-like filler having an average particle size within the range of 0.5 to 200 μm, the total filling amount of (A) and (B) components in the composition being within the range of 40 to 60% by weight, the weight percentage of (A) component being within the range of to 20% by weight, the weight percentage of (B) component being within the range of 30 to 40% by weight, the molded product having no symmetry in any of the axial plane XY, the axial plane YZ, and the axial plane XZ of the molded product.

DETAIL DESCRIPTION OF THE INVENTION

The present invention is described in detail in the following. The liquid crystalline polymer used in the present invention is a melt-processable polymer having a property capable of forming an optically anisotropic melt phase. The property of the anisotropic melt phase can be confirmed by a common polarization testing method utilizing orthogonal polarizers. More specifically, the confirmation of the anisotropic melt phase can be done by observing a molten sample placed on a Leitz hot stage through a Leitz polarization microscope in a nitrogen atmosphere at 40 magnifications. When observed between orthogonal polarizers, the liquid crystalline polymer applicable to the present invention allows polarized light to pass through even in a melted and static state, thus showing optical anisotropy.

The liquid crystalline polymer as described above is not specifically limited, but preferably an aromatic polyester or an aromatic polyester amide. A polyester which contains an aromatic polyester or an aromatic polyester amide partially within the same molecular chain belongs to the above liquid crystalline polymer. Applicable ones of them have an inherent viscosity (I.V.) of preferably at least about 2.0 dl/g, more preferably within the range of 2.0 to 10.0 dl/g, when dissolved in pentafluorophenol at 60° C. and at a concentration of 0.1% by weight.

The aromatic polyester or the aromatic polyester amide as the (A) liquid crystalline polymer applicable to the present invention is specifically preferably an aromatic polyester or an aromatic polyester amide, which contains at least one or more compounds, as structural components, selected from aromatic hydroxycarboxylic acid, aromatic hydroxyamine, and aromatic diamine.

In more detail, there are included:
(1) a polyester composed mainly of one, two or more of aromatic hydroxycarboxylic acid and a derivative thereof;
(2) a polyester composed mainly of (a) one, two or more of aromatic hydroxycarboxylic acid and a derivative thereof, (b) one, two or more of aromatic dicarboxylic acid, alicyclic dicarboxylic acid, and a derivative thereof, and (c) at least one, two or more of aromatic diol, alicyclic diol, aliphatic diol, and a derivative thereof;
(3) a polyester amide composed mainly of (a) one, two or more of aromatic hydroxycarboxylic acid and a derivative thereof, (b) one, two or more of aromatic hydroxyamine, aromatic diamine, and a derivative thereof, and (c) one, two or more of aromatic dicarboxylic acid, alicyclic dicarboxylic acid, and a derivative thereof; and
(4) a polyester amide composed mainly of (a) one, two or more of aromatic hydroxycarboxylic acid and a derivative thereof, (b) one, two or more of aromatic hydroxyamine, aromatic diamine, and a derivative thereof, (c) one, two or more of aromatic dicarboxylic acid, alicyclic dicarboxylic acid, and a derivative thereof, and (d) at least one, two or more of aromatic diol, alicyclic diol, aliphatic diol, and a derivative thereof. To the above structural components, a molecular weight adjuster may be added, if required.

Preferred examples of the compounds structuring the liquid crystalline polymer applicable to the present invention are: aromatic hydroxycarboxylic acids such as p-hydroxybenzoic acid or 6-hydroxy-2-naphthoic acid; aromatic diols such as 2,6-dihydroxynaphthalene, 1,4-dihydroxynaphthalene, 4,4'-dihydroxybiphenyl, hydroquinone, resorcin, or compounds represented by the following formula (I) and the following formula (II); aromatic dicarboxylic acids such as terephthalic acid, isophthalic acid, 4,4'-diphenylcarboxylic acid, 2,6-naphthalenedicarboxylic acid, or a compound represented by the following formula (III); and aromatic amines such as p-aminophenol or p-phenylenediamine.

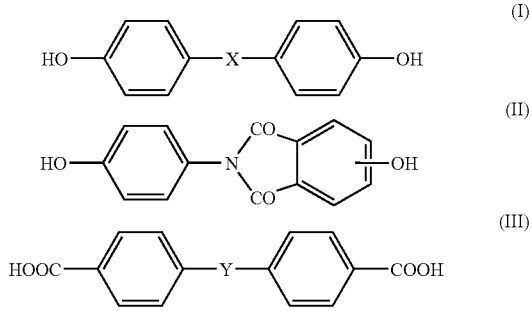

where: X is a group selected from alkylene (C1-C4), alkylidene, —O—, —SO—, —SO$_2$—, —S— and —CO—; and Y is a group selected from —(CH$_2$)— (n=1 to 4) and —O(CH$_2$)$_n$—O— (n=1 to 4).

A specifically preferred liquid crystalline polymer applicable to the present invention is an aromatic polyester having p-hydrobenzoic acid and 6-hydroxy-2-naphthoic acid as the main structural unit ingredients.

To achieve low warpage, heat resistance, flowability, and the like which are the purposes of the present invention, the liquid crystalline polymer needs to contain a specified fibrous filler and a specified plate-like filler in respective specific amounts.

The (A) fibrous filler used in the present invention has an average fiber diameter within the range of 5 to 30 μm, a weight average fiber length (excluding 10 μm or shorter fiber length) within the range of 250 to 350 μm, and a percentage of 700 μm or longer fiber length within the range of 5% by weight or less.

The (A) fibrous filler having an average fiber diameter of less than 5 μm is difficult to manufacture. If the average fiber diameter exceeds 30 μm, the prepared filler with the weight average fiber length within the range of 250 to 350 μm cannot attain a satisfactory aspect ratio, and the strength and the heat resistance deteriorate, and furthermore there appear drawbacks such as being difficult in breaking the fibers and difficult in control of average fiber length. The average fiber diameter is preferably within the range of 5 to 9 μm in terms of strength (specifically the strength at the latch structural portion) and the like.

When the weight average fiber length of the (A) fibrous filler is less than 250 μm, the desired effect cannot be attained even if the filling quantity is increased, because the reinforcing effect becomes small. Furthermore, when the weight average fiber length of the (A) fibrous filler exceeds 350 μm, the flowability deteriorates even if the blending quantity is decreased, which makes it impossible to obtain a molded product with low warpage.

Even when the weight average fiber length is within the range of 250 to 350 μm, if the percentage of the fibers having a fiber length of 700 μm or larger exceeds 5% by weight, the flowability deteriorates similar to the above, which makes it impossible to obtain a molded product with low warpage.

The term "weight average fiber length" of the (A) fibrous filler in the present invention is the value in the molded product, and can be determined by procedures described later.

The (B) component used in the present invention is a plate-like filler having an average particle size within the range of 0.5 to 200 μm. The fibers having average particle size outside the above range give less improvement effect of low warpage.

In the liquid crystalline polymer composition used in the present invention, the filling rate of (A) and (B) components is an important variable to attain the expected object of the present invention, which requires the total filling amount of (A) and (B) components in the composition within the range of 40 to 60% by weight, requiring the weight percentage of (A) component within the range of 10 to 20% by weight, and the weight percentage of (B) component within the range of 30 to 40% by weight.

When the content of the (A) fibrous filler is larger than 20% by weight, extrudability, moldability, and specifically flowability deteriorate, and deformation during reflow increases. Meanwhile, when the content thereof is less than 10% by weight, the mechanical strength deteriorates.

The (B) plate-like filler is useful for improving low wapage property, but when the content thereof exceeds 40% by weight, extrudability and moldability deteriorate to make the material brittle. Moreover, when the content thereof is less than 30% by weight, the improving effect of low warpage becomes smaller.

The total filling amount of the (A) and (B) components in the composition is within the range of 40 to 60% by weight. When the total filling amount thereof is less than 40% by weight, any combination of (A) with (B) deteriorates any of low warpage property, mechanical strength, and flowability. Moreover, when the total filling amount thereof exceeds 60% by weight, flowability and the like deteriorate.

Examples of the (A) fibrous filler used in the present invention include glass fiber, carbon fiber, whisker, inorganic fiber, and ore-based fiber. Among these, glass fiber is preferred.

Examples of the (B) plate-like filler used in the present invention are: talc, mica, kaolin, clay, graphite, vermiculite, silicates such as calcium silicate, aluminum silicate, feldspar powder, acid clay, agalmatolite clay, sericite, silimanite, bentonite, glass flake, ragstone powder or silane; carbonates such as calcium carbonate, chalk, barium carbonate, magnesium carbonate or dolomite; sulfates such as barite powder, precipitated calcium sulfate, calcined gypsum or barium sulfate; hydroxide such as alumina hydrate; oxides such as alumina, antimony oxide, magnesia, titanium oxide, zinc white, silica, silica sand, quartz, white carbon or diatom earth; sulfide such as molybdenum disulfide; plate-like wollastonite; or powder metal.

Among these, preferred ones are talc, mica, kaolin, graphite, and glass flake in terms of performance, and specifically preferred one is talc.

The fibrous filler and the plate-like filler according to the present invention can be used solely, but can also be used in combination with a known surface treatment agent or a sizing agent commonly used.

To the liquid crystalline polymer composition of the present invention can contain additives such as nucleating agent, carbon black, pigment including inorganic calcined pigment, antioxidant, stabilizer, plasticizer, lubricant, releasing agent or fire retardant, within the range not deteriorating the object of the present invention.

The asymmetric electronic parts according to the present invention is the one having no symmetry on any of the axial plane XY, axial plane YZ, and axial plane XZ of the molded product.

As described before, ordinary connectors (electronic parts) abundant in the market have symmetry on any of the axial plane XY, axial plane YZ, and axial plane XZ, and thus the dimensional accuracy and warpage of the molded product can be controlled by the design of gate position so as to keep the symmetry during molding.

To the contrary, the asymmetric electronic parts of the present invention has a complex shape, which makes it difficult to attain low warpage by molding procedures.

In the manufacture of the liquid crystalline polymer composition used in the present invention, an arbitrary manufacturing method can be used if only the filler shape specified by the present invention is attained, but a method of melt kneading using an extruder to form pellets is normally adopted. To bring the fibrous filler within a specified range, the number of cycles of kneading may be set to two or more.

Typical examples of that type of asymmetric electronic parts are a certain type of connector and socket.

Examples of the connector are memory module connectors such as DIMM connector, DDR-DIMM connector, DDR2-DIMM connector, DDR-SO-DIMM connector, DDR2-SO-DIMM connector, DDR-Micro-DIMM connector, and DDR2-Micro-DIMM connector.

Among the DDR-DIMM connector and DDR2-DIMM connector, especially suitable molded one is the memory module connector for notebook personal computers, having thin wall thickness and complex shape with 1.0 mm or less of pitch length, 60.0 mm or more of total product length, 6.0 mm or less of product height, and 100 or more of pins.

Such type of memory module connector is subjected to an IR reflow process for surface mounting at a peak temperature ranging from 230° C. to 280° C., and is required to have a flatness of 0.1 mm or less before via the IR reflow process, and to have a difference in flatness of 0.02 mm or less before and after the reflow. According to the present invention, such requirements are satisfied.

Examples of the sockets include memory card sockets such as card bus, CF card, memory stick, PC card, SD card, SDMo, Smart card, Smart Media card, microSD card, miniSD card, xD picture card or TransFlash. Memory card sockets having a rail structure and having a product height of 6.0 mm or smaller are preferable.

EXAMPLES

The present invention is described specifically in the following referring to the examples, but not limited to these examples. The determination of the physical properties and the tests in the examples were given as follows.

(1) Weight Average Fiber Length and Percentage of Fibrous Filler having 700 μm or Larger Resin composition pellets of 5 g were heated to ash for 2 hours at 600° C. The ashing residue was fully dispersed in an aqueous solution of 5% polyethyolene glycol, which was then transferred on a petri dish using a dropper. The fibrous filler in the solution was observed by a microscope. At the same time, the weight average fiber length of the fibrous filler was measured using an image analyzer (LUZEX FS, manufactured by NIRECO Corporation). On conducting the image analysis, a subroutine was applied to separate overlapped fibers into individual ones, and thus to determine the length thereeach. The determination was given by excluding the fibrous filler having a fiber length of 10 μm or smaller. The ratio of the fibrous filler having a fiber length of 700 μm or larger was calculated from the observed data.

(2) Temperature of Deflection Under Load

Figure 1:
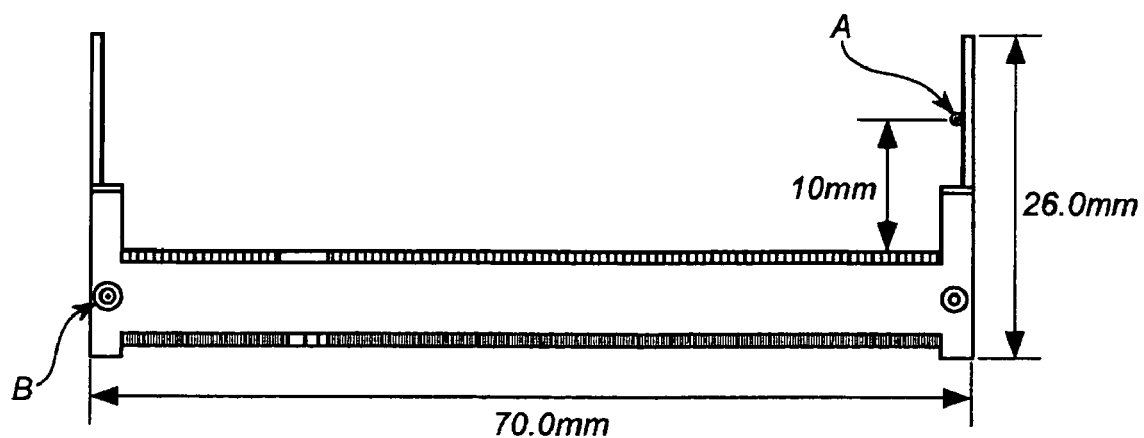
FIG. 1 shows a DDR-DIMM connector used for connector evaluation in Examples. The symbol A in the figure indicates the position to measure the strength at the latch structural portion, and the symbol B indicates the gate position.

Test pieces were molded under the following molding condition. Temperature of deflection under load was measured for thus prepared test pieces in accordance with ISO 75-1, 2.
(Molding Condition)
Molding machine: JSW J75SSII-A
Cylinder temperature:
  350° C.-350° C.-340° C.-330° C. (for the liquid crystalline polyesters 1, 3 and 5)
  370° C.-370° C.-360° C.-350° C. (for the liquid crystalline polyesters 2 and 4)
Mold temperature: 80° C.
Injection speed: 1.3 m/sec
Dwelling pressure: 55.0 MPa
Injection pressure holding time: 5 sec
Cooling time: 10 sec
Screw rotational speed: 100 rpm
Screw backpressure: 3.5 MPa (3) Evaluation of DDR-DIMM Connector With the DDR-DIMM connector mold shown in FIG. 1, (height: 4.0 mm, pitch length: 0.6 mm, the number of pins: 100×2, gate: tunnel gate, gate size: 0.75 mm in diameter, and one product in a mold), DDR-DIMM connectors were molded under the following molding condition, and thus the minimum filling pressure of connector and the warpage were evaluated.

Minimum Filling Pressure of Connector

Under the pressure on filling the resin, obtained during the molding of DDR-DIMM connector, the minimum filling pressure necessary to obtain good molded product was measured.

Warpage Evaluation

The flatness of the molded product was measured immediately after the molding and after the reflow treatment under the following condition using a non-contact dimension measurement device (Quick Vision PRO, manufactured by Mitsutoyo Corporation).

(Reflow Condition)

Reflow treatment apparatus: Large table reflow soldering apparatus, RF-30 (with far-infrared heater), manufactured by Japan Pulse Laboratories, Inc.
  Sample feed speed: 140 mm/sec
  Reflow furnace transit time: 5 min
  Temperature condition: 150° C. in preheat zone, 190° C. in reflow zone, and 251° C. of peak temperature
  Strength at Latch Structural Portion Measurement was given at the latch structural portion of the DDR-DIMM connector in FIG. 1, (measurement position: shown in FIG. 1), at a compression speed of 3 mm/min using a universal testing machine (TENCILON UTA-50KN, manufactured by ORIENTEC Co., Ltd.) to measure the stress at fracture.

(Molding Condition)

Molding machine: FANUC ROBOSHOT S-2000i 30A (nozzle diameter: 1.5 mm)
Cylinder temperature:
  350° C.-350° C.-340° C.-330° C. (for the liquid crystalline polyesters 1 and 3)
  370° C.-370° C.-360° C.-350° C. (for the liquid crystalline polyesters 2 and 4)
Mold temperature: 80° C.
Injection speed: 200 mm/sec
Dwelling pressure: 50 MPa
Cycle: Injection holding pressure 1 sec+Cooling 5 sec
Screw rotational speed: 120 rpm
Screw backpressure: 2.0 MPa Examples 1 to 5 and Comparative Examples 1 to 9

To a liquid crystalline polyester, the respective fillers listed in Table 1 were dry-blended at the respective ratios given in the table. Each of the mixture was melted and kneaded through an extruder to form pellets. From the pellets, the above test pieces were molded by an injection molding machine and evaluated. The result is shown in table 1.

The liquid crystalline polyester used, the respective fillers, and extrusion conditions are as follows.

Figure 2:
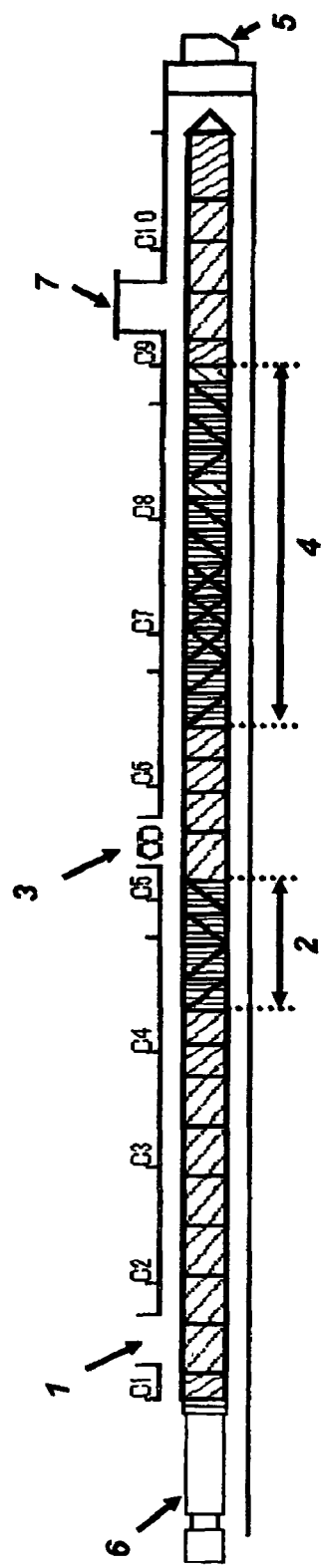
FIG. 2 is a schematic drawing of the screw of extruder used in Examples 1 to 6 and Comparative Examples 1 to 9. The symbol 1 in the figure indicates the main feed port, C1; the symbol 2 indicates the plasticizing zone, C4; the symbol 3 indicates the side feed port, C5; the symbol 4 indicates the kneading zone, C6 to C8; the symbol 5 indicates the die; the symbol 6 indicates the screw; and the symbol 7 indicates the vacuum vent.

(1) Raw Materials Used
(a) Liquid Crystalline Polyester
  Liquid crystalline polyester 1 (LCP: Vectra E950i, manufactured by Polyplastics Co., Ltd.)
  Liquid crystalline polyester 2 (LCP: Vectra S950, manufactured by Polyplastics Co., Ltd.)
  Liquid crystalline polyester 3 (LCP: Vectra E140i (containing 40% by weight of glass fibers 1 described below), manufactured by Polyplastics Co., Ltd.)
  Liquid crystalline polyester 4 (LCP: Vectra S135 (containing 35% by weight of glass fibers 1 described below), manufactured by Polyplastics Co., Ltd.)
(b) Fillers
  Glass Fibers 1
  CSO3J416 (chopped strand fibers with a diameter of 10 μm and a length of 3 mm), manufactured by Asahi Fiber Glass Co., Ltd.)
  Glass Fibers 2
  PF70E001 (milled fibers with a diameter of 10 μm and a weight-average length of 70 μm), manufactured by Nitto Boseki Co., Ltd.
  Talc
  CROWN TALC PP (an average particle diameter of 10 μm), manufactured by Matsumura Sangyo Co., Ltd.
(2) Extruder
  Twin screw extruder TEXα (a screw diameter of 33 mm, L/D of 38.5), manufactured by Japan Steel Works, Ltd.
  Schematic drawing of the screw of the extruder is given in FIG. 2.
  Structure
  Main feed port 1: C1
  Plasticizing zone 2: C4 (structuring, from the upstream side to the downstream side, forward kneading and reverse kneading; length of 132 mm)
  Side feed port 3: C5
  Kneading zone 4: C6 to C8 (structuring, from the upstream side to the downstream side, forward kneading, orthogonal kneading, reverse kneading, reverse flight, forward kneading, reverse kneading, and reverse flight; length of 363 mm)
  Feeder to the Main Feed Port
  Weighing type single screw feeder (MODEL STF-25), manufactured by Japan Steel Works, Ltd.
  Feeder to the Side Feed Port
  For Glass Fibers
  Weighing type single screw feeder (MODEL STF-25), manufactured by Japan Steel Works, Ltd.
  For talc
  Weighing type twin screw feeder (K-Tron)
(3) Extrusion Condition
  Cylinder temperature:
  For Examples 1 to 3 and Comparative Examples 1 to 4 and 7 to 9, only the temperature of the cylinder C1 positioned at the main feed port 1 was 200° C., and the temperature of all the other cylinders was 350° C. In Examples 4 and 5, only the temperature of the cylinder C1 positioned at the main feed port 1 was 200° C., and the temperature of all the other cylinders was 370° C. In Comparative Examples 5 and 6, only the temperature of the kneading zones (C6 to C8) was set to 330° C. and 310° C., respectively.
(4) Method of Kneading and Extruding the Resin Composition With the above twin screw extruder, the pellets of liquid crystalline polyester were fed from the main feed port 1, while the fillers were fed from the side feed port 3.

The screw rotational speed and the throughput rate were set to the values given in Table 1. The molten resin composition ejected from the die 5 in a strand shape was transferred by a mesh belt conveyor manufactured by Tanaka Seisakusho Co., Ltd. while cooling the strands by water spray. The cooled strands were cut to obtain pellets.

Example 6

The liquid crystalline polyester 5 was prepared under the same extrusion condition as that in Example 1 so that the liquid crystalline polyester may preliminarily contain 40% by weight of the glass fibers 3 described below. Then, pelletization was carried out similar to Example 3 except for using the liquid crystalline polyester 5 instead of the liquid crystalline polyester 3. From thus prepared pellets, the above test pieces were molded by an injection molding machine and evaluated. The result is shown in table 1.

Glass Fibers 3
ECS04T-790DE (chopped strand fibers of 6 μm of average fiber diameter and 3 mm of length), manufactured by Nippon Electric Glass Co., Ltd.

For the test pieces of Examples 1 to 3 and Example 6, the strength at the latch structural portion was measured. The result is given in Table 2.

TABLE 1

|  |  | Examples |  |  |  |  |  | Comparative Examples |  |
|---|---|---|---|---|---|---|---|---|---|
|  |  | 1 | 2 | 3 | 4 | 5 | 6 | 1 | 2 |
| Contents of Raw Materials Used for Extrusion |  |  |  |  |  |  |  |  |  |
| Liquid Crystalline Polyester 1 | wt % | 27.5 | 20.0 | 32.5 |  |  | 32.5 | 50.0 | 50.0 |
| Liquid Crystalline Polyester 2 | wt % |  |  |  | 41.4 | 27.1 |  |  |  |
| Liquid Crystalline Polyester 3, containing 40% of glass fiber 1 | wt % | 37.5 | 50.0 | 37.5 |  |  |  | 25.0 |  |
| Liquid Crystalline Polyester 4, containing 35% of glass fiber 1 | wt % |  |  |  | 28.6 | 42.9 |  |  |  |
| Liquid Crystalline Polyester 5, containing 40% of glass fiber 3 | wt % |  |  |  |  |  | 37.5 |  |  |
| Talc | wt % | 35.0 | 30.0 | 30.0 | 30.0 | 30.0 | 30.0 | 25.0 | 35.0 |
| Added Glass Fibers 1 | wt % |  |  |  |  |  |  |  | 15.0 |
| Added Glass Fibers 2 | wt % |  |  |  |  |  |  |  |  |
| Contents of Pellets |  |  |  |  |  |  |  |  |  |
| liquid crystalline polyester | wt % | 50.0 | 50.0 | 55.0 |  |  | 55.0 | 65.0 | 50.0 |
| liquid crystalline polyester | wt % |  |  |  | 60.0 | 55.0 |  |  |  |
| Talc | wt % | 35.0 | 30.0 | 30.0 | 30.0 | 30.0 | 30.0 | 25.0 | 35.0 |
| Glass Fibers 1 | wt % | 15.0 | 20.0 | 15.0 | 10.0 | 15.0 |  | 10.0 | 15.0 |
| Glass Fibers 2 | wt % |  |  |  |  |  |  |  |  |
| Glass Fibers 3 | wt % |  |  |  |  |  | 15.0 |  |  |
| Rotational Speed | rpm | 300 | 300 | 300 | 300 | 300 | 300 | 300 | 300 |
| Throughput Rate | kg/h | 20 | 20 | 20 | 20 | 20 | 20 | 20 | 20 |
| Weight Average Length of Fibers | μm | 300 | 300 | 290 | 305 | 310 | 340 | 310 | 480 |
| Percentage of Fibrous Filler Having 700 μm or Longer Length | wt % | 3.4 | 1.3 | 3.6 | 4.2 | 4.5 | 4.8 | 4.6 | 13.1 |
| Flatness of Connector | mm | 0.075 | 0.082 | 0.076 | 0.09 | 0.071 | 0.068 | 0.103 | 0.111 |
| Deformation of Connector | mm | 0.004 | 0.004 | 0.005 | 0.010 | 0.010 | 0.031 | 0.013 | 0.023 |
| Minimum Filling Pressure of Connector | Mpa | 143 | 140 | 135 | 71 | 91 | 129 | 122 | 155 |
| Temperature of Deflection Under Load | ° C. | 260 | 263 | 260 | 307 | 317 | 250 | 255 | 266 |

|  |  | Comparative Examples |  |  |  |  |  |  |
|---|---|---|---|---|---|---|---|---|
|  |  | 3 | 4 | 5 | 6 | 7 | 8 | 9 |
| Contents of Raw Materials Used for Extrusion |  |  |  |  |  |  |  |  |
| Liquid Crystalline Polyester 1 | wt % | 65.0 | 55.0 | 36.5 | 39.5 | 55.7 | 42.5 | 52.5 |
| Liquid Crystalline Polyester 2 | wt % |  |  |  |  |  |  |  |
| Liquid Crystalline Polyester 3, containing 40% of glass fiber 1 | wt % |  |  | 22.5 | 17.5 |  | 37.5 | 12.5 |
| Liquid Crystalline Polyester 4, containing 35% of glass fiber 1 | wt % |  |  |  |  |  |  |  |
| Liquid Crystalline Polyester 5, containing 40% of glass fiber 3 | wt % |  |  |  |  |  |  |  |
| Talc | wt % | 25.0 | 30.0 | 35.0 | 35.0 | 30.0 | 20.0 | 35.0 |
| Added Glass Fibers 1 | wt % | 10.0 | 15.0 | 6.0 | 8.0 |  |  |  |
| Added Glass Fibers 2 | wt % |  |  |  |  | 15.0 |  |  |
| Contents of Pellets |  |  |  |  |  |  |  |  |
| liquid crystalline polyester | wt % | 65.0 | 55.0 | 50.0 | 50.0 | 55.7 | 65.0 | 60.0 |
| liquid crystalline polyester | wt % |  |  |  |  |  |  |  |
| Talc | wt % | 25.0 | 30.0 | 35.0 | 35.0 | 30.0 | 20.0 | 35.0 |
| Glass Fibers 1 | wt % | 10.0 | 15.0 | 15.0 | 15.0 |  | 15.0 | 5.0 |
| Glass Fibers 2 | wt % |  |  |  |  | 15.0 |  |  |
| Glass Fibers 3 | wt % |  |  |  |  |  |  |  |
| Rotational Speed | rpm | 300 | 300 | 300 | 300 | 300 | 300 | 300 |
| Throughput Rate | kg/h | 20 | 20 | 20 | 20 | 20 | 20 | 20 |
| Weight Average Length of Fibers | μm | 520 | 505 | 310 | 315 | 62 | 315 | 320 |
| Percentage of Fibrous Filler Having 700 μm or Longer Length | wt % | 22.1 | 17.9 | 7.7 | 11.8 | 0 | 3.8 | 4.4 |

TABLE 1-continued

| | | | | | | | | |
|---|---|---|---|---|---|---|---|---|
| Flatness of Connector | mm | 0.159 | 0.109 | 0.125 | 0.132 | 0.080 | 0.114 | 0.123 |
| Deformation of Connector | mm | 0.037 | 0.010 | 0.031 | 0.036 | 0.002 | 0.008 | 0.021 |
| Minimum Filling Pressure of Connector | Mpa | 137 | 152 | 145 | 146 | 115 | 121 | 121 |
| Temperature of Deflection Under Load | ° C. | 267 | 267 | 262 | 262 | 239 | 257 | 250 |

TABLE 2

| | | Examples | | | |
|---|---|---|---|---|---|
| | | 1 | 2 | 3 | 6 |
| Raw materials used for extrusion | | | | | |
| Liquid Crystalline Polyester 1 | wt % | 27.5 | 20.0 | 32.5 | 32.5 |
| Liquid Crystalline Polyester 2 | wt % | | | | |
| Liquid Crystalline Polyester 3, containing 40% of glass fiber 1 | wt % | 37.5 | 50.0 | 37.5 | |
| Liquid Crystalline Polyester 4, containing 35% of glass fiber 1 | wt % | | | | |
| Liquid Crystalline Polyester 5, containing 40% of glass fiber 3 | wt % | | | | 37.5 |
| Talc | wt % | 35.0 | 30.0 | 30.0 | 30.0 |
| Contents of Pellets | | | | | |
| liquid crystalline polyester | wt % | 50.0 | 50.0 | 55.0 | 55.0 |
| liquid crystalline polyester | wt % | | | | |
| liquid crystalline polyester | wt % | | | | |
| liquid crystalline polyester | wt % | | | | |
| liquid crystalline polyester | wt % | | | | |
| Talc | wt % | 35.0 | 30.0 | 30.0 | 30.0 |
| Glass Fibers 1 | wt % | 15.0 | 20.0 | 15.0 | |
| Glass Fibers 2 | wt % | | | | |
| Glass Fibers 3 | wt % | | | | 15.0 |
| Rotational Speed | rpm | 300 | 300 | 300 | 300 |
| Throughput Rate | kg/h | 20 | 20 | 20 | 20 |
| Weight Average Length of Fibers | μm | 300 | 300 | 290 | 340 |
| Percentage of Fibrous Filler Having 700 μm or Longer Length | wt % | 3.4 | 1.3 | 3.6 | 4.8 |
| Strength at the Latch Structural Portion | N | 6.2 | 6.9 | 7.0 | 7.6 |

The invention claimed is:

1. An asymmetric electronic part, prepared by molding a liquid crystalline polymer composition comprising (A) a fibrous filler having an average fiber diameter within the range of 5 to 30 μm, having a weight average fiber length within the range of 250 to 350 μm, excluding 10 μm or shorter fiber length, and having a content of a fibrous filler being 700 μm or longer within the range of 5% by weight or less; and (B) a plate-like filler having an average particle size within the range of 0.5 to 200 μm, the total filling amount of (A) and (B) components in the composition being within the range of 40 to 60% by weight, the weight percentage of (A) component being within the range of 10 to 20% by weight, the weight percentage of (B) component being within the range of 30 to 40% by weight, the molded product having no symmetry in any of the axial plane XY, the axial plane YZ, and the axial plane XZ of the molded product.

2. The asymmetric electronic part according to claim 1, wherein the average fiber diameter of the (A) fibrous filler is within the range of 5 to 9 μm.

3. The asymmetric electronic part according to claim 1 being a connector.

4. The asymmetric electronic part according to claim 1, being a connector for a memory module, having a pitch length of 1.0 mm or less, the total product length of 60.0 mm or more, a height of 6.0 mm or less and the number of pins of 100 or more.

5. The asymmetric electronic part according to claim 1, being a memory card socket having a rail structure and having a height of 6.0 mm or less.

6. The asymmetric electronic part according to claim 2 being a connector.

7. The asymmetric electronic part according to claim 1 being a socket.

8. The asymmetric electronic part according to claim 2 being a socket.

* * * * *